(12) United States Patent
Bartow et al.

(10) Patent No.: US 11,563,886 B2
(45) Date of Patent: *Jan. 24, 2023

(54) AUTOMATED EYEWEAR DEVICE SHARING SYSTEM

(71) Applicant: Snap Inc., Santa Monica, CA (US)

(72) Inventors: Andrew Bartow, Cambridge, NE (US); Matthew Hanover, Los Angeles, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,559

(22) Filed: Jan. 31, 2022

(65) Prior Publication Data

US 2022/0159178 A1 May 19, 2022

Related U.S. Application Data

(63) Continuation of application No. 16/587,158, filed on Sep. 30, 2019, now Pat. No. 11,297,224.

(51) Int. Cl.
*H04N 5/232* (2006.01)
*G06F 16/51* (2019.01)
(Continued)

(52) U.S. Cl.
CPC ....... *H04N 5/23222* (2013.01); *G02B 27/017* (2013.01); *G02C 3/003* (2013.01); *G02C 5/146* (2013.01); *G06F 16/51* (2019.01)

(58) Field of Classification Search
None
See application file for complete search history.

(56) References Cited

U.S. PATENT DOCUMENTS 7,006,241 B1 2/2006 Yamamoto
10,970,029 B2* 4/2021 Lindblom ........ H04N 21/44008
(Continued)

FOREIGN PATENT DOCUMENTS

KR 1020130017922 A 2/2013
KR 2020140000110 U 1/2014
(Continued)

OTHER PUBLICATIONS

International Search Report and Written Opinion for International Application No. PCT/US2020/052176, dated Jan. 5, 2021 (Jan. 5, 2021)—10 pages.

*Primary Examiner* — Cynthia Segura
(74) *Attorney, Agent, or Firm* — Culhane Meadows PLLC; Stephen J. Weed

(57) ABSTRACT

Systems, devices, media, and methods are described for capturing a series of raw images by portable electronic devices, such as wearable devices including eyewear, and automating the process of processing such raw images by a client mobile device, such as a smart phone, such automation including the process of uploading to a network and directing to a target audience. In some implementations, a user selects profile settings on the client device before capturing images on the companion device, so that when the companion device has captured the images, the system follows the profile settings upon automatically processing the images captured by the companion device.

20 Claims, 8 Drawing Sheets

(51) Int. Cl.
*G02C 3/00* (2006.01)
*G02C 5/14* (2006.01)
*G02B 27/01* (2006.01)

(56) References Cited

U.S. PATENT DOCUMENTS

| | | | |
|---|---|---|---|
| 11,297,224 B2* | 4/2022 | Bartow | G02C 5/146 |
| 11,320,667 B2* | 5/2022 | Hanover | G02B 27/64 |
| 11,330,094 B2* | 5/2022 | Robertson | H04M 1/72412 |
| 2009/0091776 A1 | 4/2009 | Kobayashi et al. | |
| 2010/0020185 A1 | 1/2010 | Sako et al. | |
| 2012/0019645 A1 | 1/2012 | Maltz | |
| 2014/0002496 A1 | 1/2014 | Lamb et al. | |
| 2015/0006637 A1 | 1/2015 | Kangas et al. | |
| 2015/0009309 A1 | 1/2015 | Heinrich et al. | |
| 2015/0113369 A1* | 4/2015 | Chan | G06F 3/1454 |
| | | | 715/203 |
| 2015/0355463 A1 | 12/2015 | Sako et al. | |
| 2017/0185738 A1 | 6/2017 | Moharir et al. | |
| 2018/0091729 A1 | 3/2018 | Hanover et al. | |
| 2018/0213175 A1* | 7/2018 | Hlavac | H04N 1/2191 |
| 2019/0324275 A1 | 10/2019 | Nishizawa et al. | |
| 2019/0331914 A1 | 10/2019 | Lee et al. | |
| 2021/0168473 A1* | 6/2021 | Li | H04N 21/8166 |
| 2022/0039011 A1* | 2/2022 | Bamberger | H04W 52/383 |

FOREIGN PATENT DOCUMENTS

| | | |
|---|---|---|
| KR | 1020140128489 A | 11/2014 |
| WO | 2018130995 A1 | 7/2018 |

* cited by examiner

AUTOMATED EYEWEAR DEVICE SHARING SYSTEM

CROSS-REFERENCE TO RELATED APPLICATIONS

This application is a Continuation of U.S. application Ser. No. 16/587,158 filed on Sep. 30, 2019, the contents of which are incorporated fully herein by reference.

TECHNICAL FIELD

Examples set forth in the present disclosure relate to portable electronic devices, including companion and/or wearable devices such as eyewear. More particularly, but not by way of limitation, the present disclosure describes systems and methods for capturing a series of raw images by such portable electronic devices and automatically processing such raw images by a client mobile device, such as a smart phone, including uploading to a network and directing to a target audience.

BACKGROUND

Many types of computers and electronic devices available today, including mobile devices (e.g., smartphones, tablets, and laptops) and companion and/or wearable devices (e.g., smartglasses, digital eyewear, headwear, headgear, and head-mounted displays), include one or more cameras for capturing one or more images (e.g., still photographs and video) as well as internal sensors for collecting information about the location, orientation, motion, and heading of the device. These devices are capable of sending the images to other devices.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
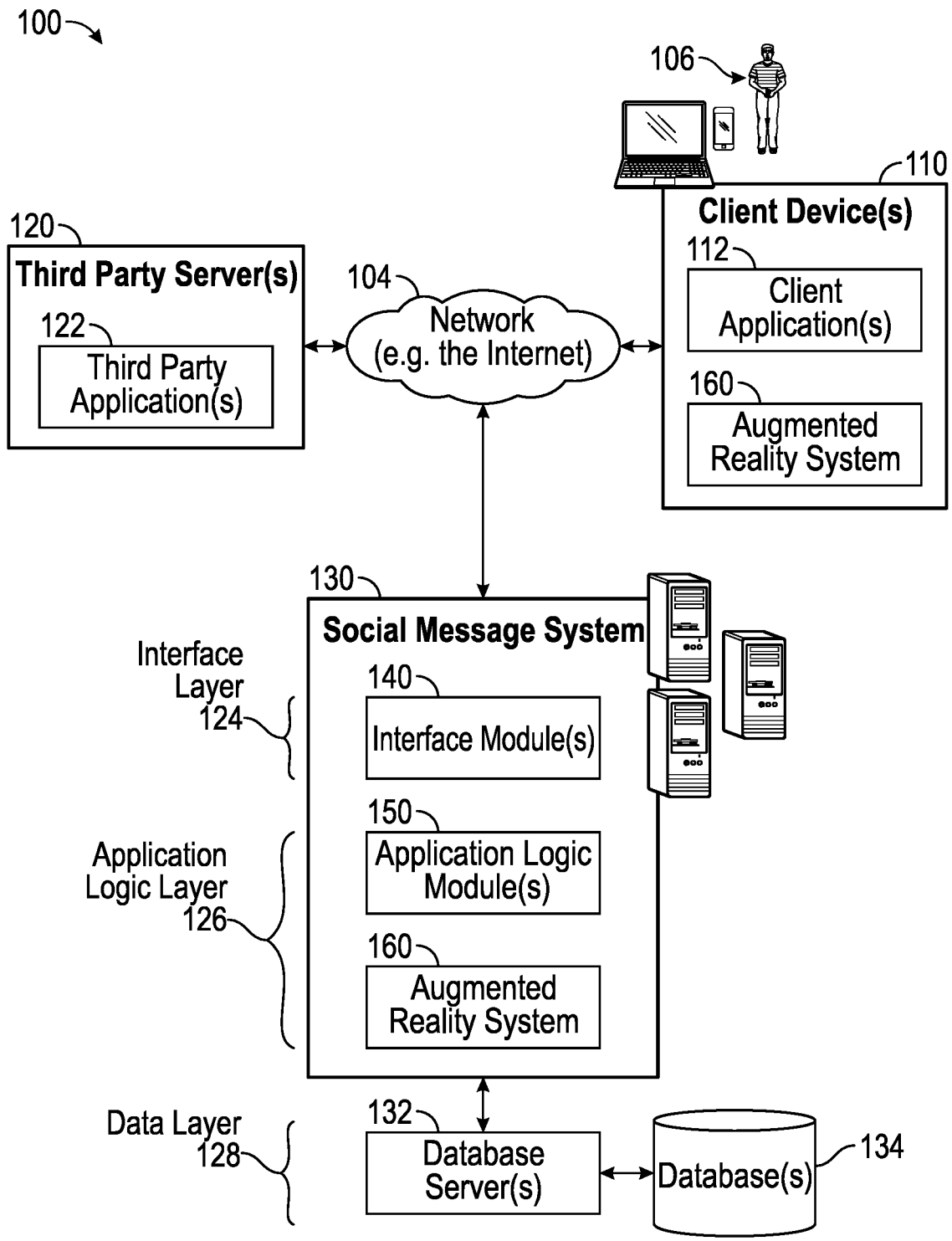
FIG. 1A is a block diagram illustrating a networked system, according to some examples.

Various implementations and details are described with reference to an example: an image and video capture and sharing system for capturing a series of raw images segments with a portable electronic device and automating the process of processing such raw images segments by a client mobile device, such as a smart phone, including the process of uploading to a network and directing to a target audience.

There may be times that a user may wish to immediately share or elect to immediately or almost immediately share upon syncing with a mobile device, images captured with a companion device. This may occur, for example, while a user is driving, or simply does not feel like manually processing images at the moment captured. In such cases, the user may end up not sharing the captured images because by the time the user is able to turn attention to the images, the moment is gone (such that the images have become stale and/or obsolete). The automated image capture, composition, and sharing system according to examples herein address this and other issues. It may also increase the engagement of companion (e.g., eyewear) device users, because they can share more and live more in the moment.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "image" or "images" as used herein includes at least one singular image, such as a photograph, and/or at least one collection or series of related images, such as a video, time-lapse photograph, etc.

The term "coupled," "connected" or "paired," as used herein refers to any logical, optical, physical, or electrical connection, including a link or the like by which the electrical or magnetic signals produced or supplied by one system element are imparted to another coupled, connected or paired system element. Unless described otherwise, coupled, connected or paired elements or devices are not necessarily directly connected to one another and may be separated by intermediate components, elements, or communication media, one or more of which may modify, manipulate, or carry the electrical signals. The term "paired" often (although not always) also connotes "bonding," which is the exchange of long-term keys after pairing occurs, and storing those keys for later use, i.e., the creation of permanent security between devices. The term "on" means directly supported by an element or indirectly supported by the element through another element that is integrated into or otherwise supported by the element.

The orientations of the eyewear device, associated components and any complete devices incorporating a three-dimensional camera such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to direction or orientation of any three-dimensional camera or component of the three-dimensional camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

A wide variety of visible-light cameras are integrated into portable electronic devices, including mobile phones and wearable devices like electronic eyewear devices (e.g., smartglasses). A stereo camera has two lenses or includes two cameras working together, each with its own image sensor or film frame. A stereo camera captures two images of the same scene, taken from slightly different perspectives because the lenses are spaced apart. The separation distance between the lenses may be sized to approximate the distance between a person's eyes, to better simulate human binocular vision. A stereo camera captures two separate images of the same scene, taken from slightly different perspectives.

Reference now is made in detail to the examples illustrated in the accompanying drawings and discussed below.

FIG. 1A is a network diagram depicting a network system 100, which may be employed in one example, having a client-server architecture configured for exchanging data over a network. Such a network system may be used to communicate information for virtual objects to be displayed on client devices 110, street view data used to create façade models, and the resulting façade models as they are used by augmented reality system 160. In some examples, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other examples may include other network architectures, such as peer-to-peer or distributed network environments.

As shown in FIG. 1A, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1A. represents a set of executable software instructions and the corresponding hardware (e.g., memory and processor) for executing the instructions. To avoid obscuring the subject matter described herein with unnecessary detail, various functional modules and engines that are not germane to conveying an understanding of the described subject matter have been omitted from FIG. 1A. Additional functional modules and engines may be used with a social messaging system, such as that illustrated in FIG. 1A, to facilitate additional functionality that is not specifically described herein. Furthermore, the various functional modules and engines depicted in FIG. 1A may reside on a single server computer or may be distributed across several server computers in various arrangements. Moreover, although the social messaging system 130 is depicted in FIG. 1A as a three-tiered architecture, the subject matter is by no means limited to such an architecture.

As shown in FIG. 1A, the interface layer 124 consists of interface modules (e.g., a web server) 140, which receive requests from various client-computing devices and servers, such as client devices 110 executing client applications 112, and third party servers 120 executing third party applications 122. In response to received requests, the interface modules 140 communicate appropriate responses to requesting devices via a network 104. For example, the interface modules 140 can receive requests such as Hypertext Transfer Protocol (HTTP) requests or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client applications 112. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), automotive computing devices with driver heads up displays (HUD), smart phones, tablets, ultrabooks, netbooks, laptops, desktops, multi-processor systems, microprocessor-based or programmable consumer electronics, game consoles, set-top boxes, network personal computers (PCs), mini-computers, and the like. Users 106 can include a person, a machine, or other means of interacting with the client devices 110. In some examples, the users 106 interact with the social messaging system 130 via the client devices 110.

As shown in FIG. 1A, the data layer 128 has one or more database servers 132 that facilitate access to information storage repositories or databases 134. The databases 134 are storage devices that store data such as sets of images of external areas generated by client devices 110 and sent to social messaging system 130; sets of façade data generated from images including buildings; map data matching images and façade data to geolocations; and other such data. In one example, a database stores images captured from a street and associates those images with map data. Some implementations of such an example may use filters or image cropping to remove people from the images, such as an example that only stores image data above a height that includes people. Databases 134 may also store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts)

on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130, including aspects of augmented reality system 160. For instance, a social messaging application can be implemented with one or more of the application logic modules 150. The social messaging application provides a messaging mechanism for users of the client devices 110 to send and receive messages that include text and media content such as pictures and video. The social messaging application may also include mechanisms for providing augmented reality displays and content that integrate pictures and video with virtual objects. The client devices 110 may provide augmented reality displays and may also enable users to access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Similarly, augmented reality content may be provided for a predefined duration. Other applications and services may be separately embodied in their own application logic modules 150.

As illustrated in FIG. 1A, the social messaging system 130 or the client applications 112 may include augmented reality system 160 that provides functionality to generate augmented reality images. In some examples, the augmented reality system 160 can be implemented as a standalone system on a client device 110 and is not necessarily included in the social messaging system 130. In other examples, the client devices 110 include a portion of the augmented reality system 160 (e.g., a portion of the augmented reality system 160 may be included independently or in the client applications 112). In examples where the client devices 110 include a portion of the augmented reality system 160, the client devices 110 can work alone or in conjunction with the portion of the augmented reality system 160 included in a particular application server or included in the social messaging system 130.

Figure 1B:
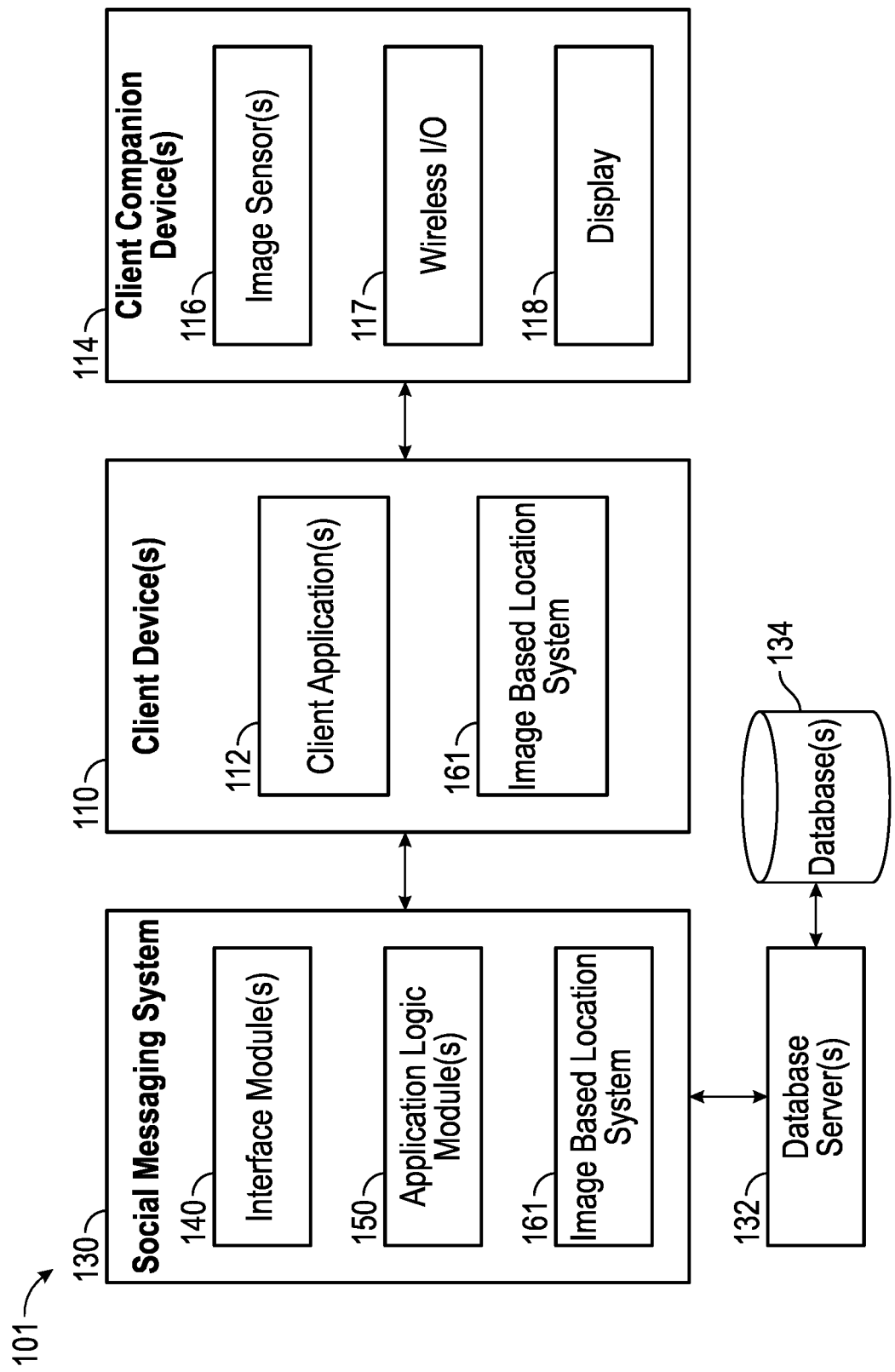
FIG. 1B is a block diagram illustrating a networked system including client and companion (e.g., wearable) devices, according to some examples.

FIG. 1B illustrates an alternative network system 101 that may be used with certain examples. Network system 101 includes social messaging system 130 with interface modules 140, application logic modules 150, database servers 132, and databases 134, as well as client devices 110 operating client applications 112, just as in network system 100. Network system 101, however, additionally includes client companion devices 114 connected to client devices 110. Client companion devices 114 may be wearable devices such as glasses, visors, watches, or other network enabled items. Client companion devices may also be any device described herein that accesses a network such as network 104 via another device such as client device 110. Client companion devices 114 include image sensors 116, wireless input and output (I/O) 117, and a display 118. Client companion devices 114 may include one or more processors, a battery, and a memory, but may have limited processing and memory resources. In such examples, client device 110 and/or server computing devices used for social messaging system 130 may be used via network connections to provide remote processing and memory resources for client companion devices 114. In one example, for example, client companion device 114 may be a pair of network enabled glasses, such as the glasses 200 of FIG. 2. Such glasses may not include any sensor based positioning system, so that methods described herein that perform an initial location estimate may estimate the position of a client device 110 that is wirelessly connected to the glasses. The glasses 200, however, gather images using image sensors 116 and use those images as a basis to generate and present augmented reality information to the user via display 118. The perspective of the images and any virtual objects added to images thus need to be tracked based on the position of the client companion device 114 (e.g., glasses 200). In such an example, the initial location may be based on the client device 110 location using global positioning system (GPS) or network enhanced location services. An image based location system 161 operating either on client devices 110, on social messaging system 130, or on both, may then use image data from image sensors 116 along with façade data identified by the initial location of the client device 110 to determine a location of the client companion device 114. In some examples, because the range of wireless I/O 117 systems is low, the system may assume that the location of client device 110 is within a sufficiently close distance of client companion device 114 that the façade data for buildings close to both devices will be the same.

Figure 2A:
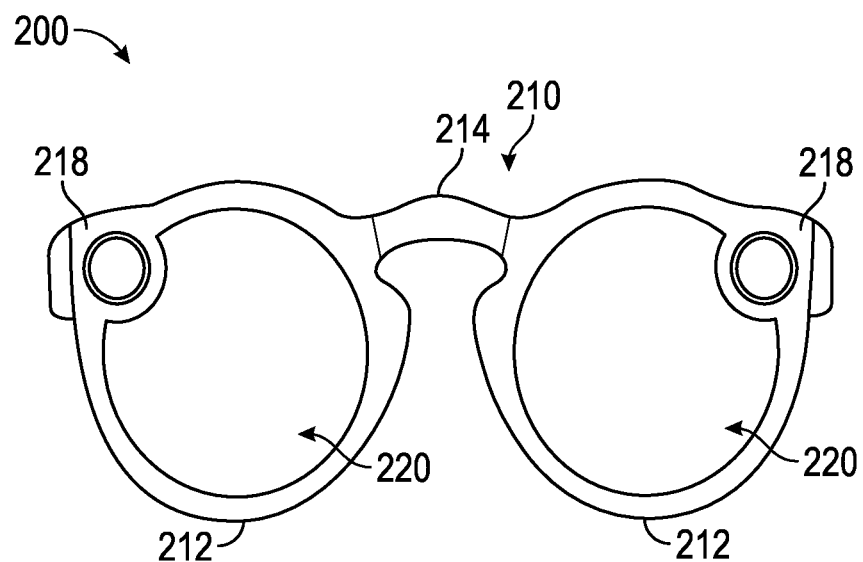
FIGS. 2A and 2B are front and top views of example hardware configurations of an eyewear device utilized in the image capture, composition and sharing system.
Figure 2B:
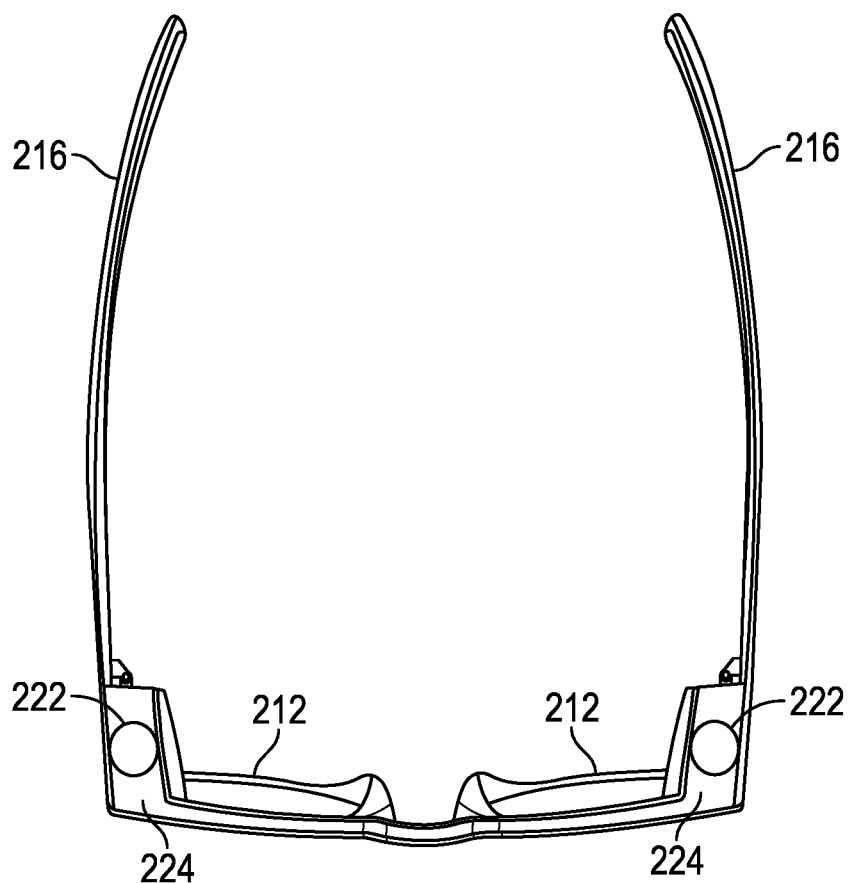

In one example, the client device 110 is a mobile device, such as a smartphone, and the companion device 114 is an eyewear device. FIGS. 2A and 2B present front and top perspective views of an example eyewear device 200. As a general overview, eyewear device 200 includes a frame 210 and one or more panels 220. The following paragraphs set forth additional details of eyewear device 200.

Frame 210 includes a pair of rims 212 which define respective openings. The openings defined by rims 212 sit in front of a user's eyes when the user wears eyewear device 200. Rims 212 may completely surround or encircle their respective openings, as shown in FIG. 2A, or may only partially surround or encircle their respective openings.

Frame 210 may further include a bridge 214 connecting between rims 212, and a pair of arms 216 extending from respective rims 212. Bridge 214 sits in place on the upper part of a user's nose when the user wears eyewear device 200. Arms 216 extend along the sides of the user's head, and may rest on the user's ears, when the user wears eyewear device 200. Arms 216 may rigidly connect to rims 212 or may connect to rims 212 via hinges to enable folding of arms 216.

Panels 220 are positioned within respective ones of the openings defined by rims 212 of frame 210. Panels 220 cover an area in front of the user's eyes when the user wears eyewear device 200.

At least one of the panels 220 may be a waveguide coupled to a display. Further, in this example, portions of frame 210, e.g., rims 212, bridge 214, and/or legs 216, may support and/or house components of the display, including for example, a light source, a controller, and/or a power supply. The waveguide may be, for example, diffractive, holographic, or reflective. Suitable material for forming a panel 220 as a waveguide will be known from the description herein.

Where only one panel 220 is coupled to a display, the other panel 220 may take any other form, or may be omitted.

Alternative panels 220 may contain or consist of transparent, translucent, or tinted materials, and/or may take the form of a lens, if desired.

FIG. 2A further shows two cameras 218 capable of capturing image information for a scene from two separate viewpoints. Left and right visible-light cameras 218 may be situated on left and right chunks 224. Left and right visible-light cameras 218 are sensitive to the visible-light range wavelength. The two captured images may be used to project a three-dimensional display onto a screen for viewing with 3D glasses.

The eyewear device 200 may include optical assemblies 180 with image displays to present images, such as depth images.

Eyewear device 200 includes one or more structures for obtaining user input, which in the example depicted in FIG. 2B include buttons 222 on each side of the device, e.g., on chunks 224. It is understood that such input structures may be effectuated by a wide variety of means, including physical buttons, touch-sensitive surfaces, etc., and that the location and size of such input structures are not limited to the locations and sizes depicted in FIG. 2. It is also understood that although two buttons are depicted in FIG. 2, there may be more or less input structures.

Examples of visible-light cameras 218 include a high-resolution complementary metal-oxide-semiconductor (CMOS) image sensor and a digital VGA camera (video graphics array) capable of resolutions of 640p (e.g., 640× 480 pixels for a total of 0.3 megapixels), 720p, or 1080p. Other examples of visible-light cameras 218 that can capture high-definition (HD) still images and store them at a resolution of 1642 by 1642 pixels (or greater); and/or record high-definition video at a high frame rate (e.g., thirty to sixty frames per second or more) and store the recording at a resolution of 1216 by 1216 pixels (or greater).

The eyewear device 200 may capture image sensor data from the visible-light cameras 218 along with geolocation data, digitized by an image processor, for storage in a memory. The left and right raw images captured by respective visible-light cameras 218 are in the two-dimensional space domain and comprise a matrix of pixels on a two-dimensional coordinate system that includes an X-axis for horizontal position and a Y-axis for vertical position. Each pixel includes a color attribute value (e.g., a red pixel light value, a green pixel light value, and/or a blue pixel light value); and a position attribute (e.g., an X-axis coordinate and a Y-axis coordinate).

In order to capture stereo images for later display as a three-dimensional projection, an image processor 912 (shown in FIG. 3) may be coupled to the visible-light cameras 218 to receive and store the visual image information. A timestamp for each image may be added by the image processor 912 or another processor which controls operation of the visible-light cameras 218, which act as a stereo camera to simulate human binocular vision. The timestamp on each pair of images allows the images to be displayed together as part of a three-dimensional projection. Three-dimensional projections create an immersive, life-like experience that is desirable in a variety of contexts, including virtual reality (VR) and video gaming.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, and/or a blue pixel light value); a position attribute (e.g., an X location coordinate, a Y location coordinate, and a Z location coordinate); a texture attribute and/or a reflectance attribute. The texture attribute quantifies the perceived texture of the depth image, such as the spatial arrangement of color or intensities in a region of vertices of the depth image.

Disposed inside chunks 224 may be various interconnected circuit boards, such as PCBs or flexible PCBs, that include controller circuits for visible-light cameras 218, microphone(s), low-power wireless circuitry (e.g., for wireless short range network communication via Bluetooth™), high-speed wireless circuitry (e.g., for wireless local area network communication via WiFi).

Figure 3:
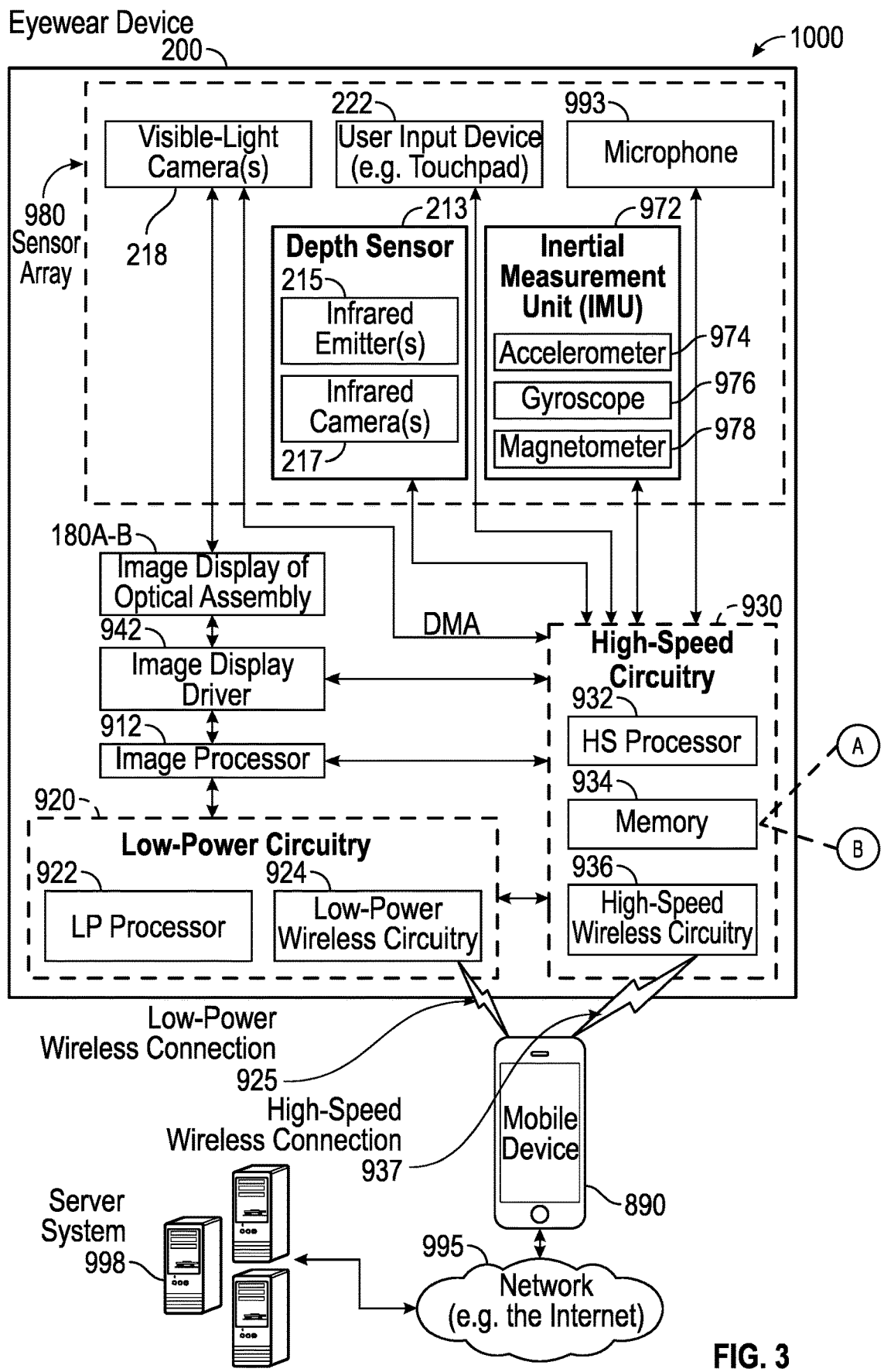
FIG. 3 is a functional block diagram of an example image capture, composition and sharing system including an eyewear device, a mobile device, and a server system connected via various networks.
Figure 3:
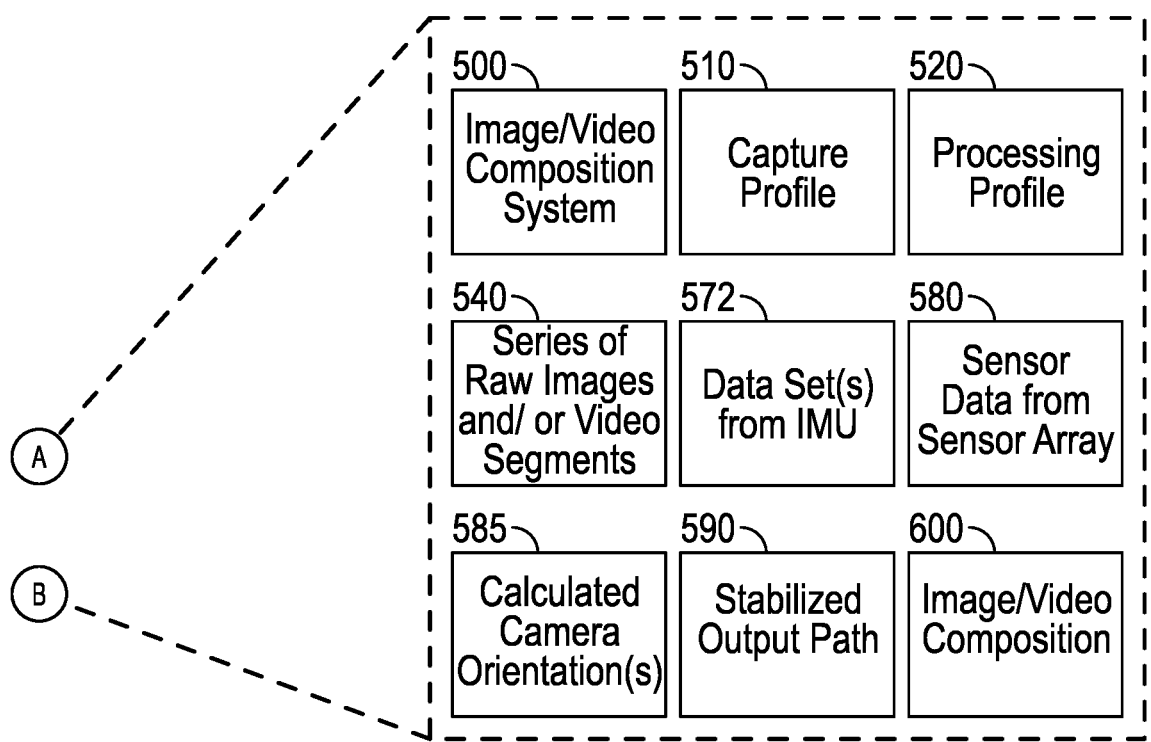

FIG. 3 is a functional block diagram of an example image capture, composition and sharing system 1000 including an eyewear device 200, a mobile device 890, and a server system 998 connected via various networks 995 such as the Internet. The system 1000 includes a low-power wireless connection 925 and a high-speed wireless connection 937 between the eyewear device 200 and a mobile device 890, as shown.

The eyewear device 200 includes one or more visible-light cameras 218 which may be capable of capturing still images, as described herein. The cameras 218 may have a direct memory access (DMA) to high-speed circuitry 930. The pair of cameras 218 may function as a stereo camera, as described herein. The cameras 218 may be used to capture initial-depth images that may be rendered into three-dimensional (3D) models that are texture-mapped images of a red, green, and blue (RGB) imaged scene. The device 200 may also include a depth sensor 213, which uses infrared signals to estimate the position of objects relative to the device 200. The depth sensor 213 in some examples includes one or more infrared emitter(s) 215 and infrared camera(s) 217.

The eyewear device 200 may further include two image displays of each optical assembly 180A, 180B (one associated with the left side and one associated with the right side). The eyewear device 200 also includes an image display driver 942, an image processor 912, low-power circuitry 920, and high-speed circuitry 930. The image displays of each optical assembly 180A, 180B are for presenting images, including still images and video. The image display driver 942 is coupled to the image displays of each optical assembly 180A, 180B in order to control the images displayed. The eyewear device 200 further includes a user input device 222 (e.g., a button, touch sensor or touchpad) to receive a two-dimensional input selection from a user.

The components shown in FIG. 3 for the eyewear device 200 are located on one or more circuit boards, for example a PCB or flexible PCB, located in the rims or temples of the example depicted in FIG. 2. Alternatively, or additionally, the depicted components can be located in the chunks, frames, hinges, or bridge of the eyewear device 200. Left and right visible-light cameras 218 can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

In the example shown in FIG. 3, high-speed circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of each optical assembly 180A, 180B. High-speed processor 932 may be any processor capable of managing high-speed communications and operation of any general computing system needed for eyewear device 200. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 200 and the operating system is stored in memory 934 for execution. In addition to any other responsibilities, the high-speed processor 932 executes a software architecture for the eyewear device 200 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the eyewear device 200 can include short range transceivers (Bluetooth™) and wireless wide, local, or wide-area network transceivers (e.g., cellular or WiFi). Mobile device 890, including the transceivers communicating via the low-power wireless connection 925 and the high-speed wireless connection 937, may be implemented using details of the architecture of the eyewear device 200, as can other elements of the network 995.

Memory 934 includes any storage device capable of storing various data and applications, including, among other things, camera data generated by the left and right visible-light cameras 218, the infrared camera(s) 217, the image processor 912, and images generated for display by the image display driver 942 on the image display of each optical assembly 180A, 180B. Although the memory 934 is shown as integrated with high-speed circuitry 930, the memory 934 in other examples may be an independent, standalone element of the eyewear device 200. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 4:
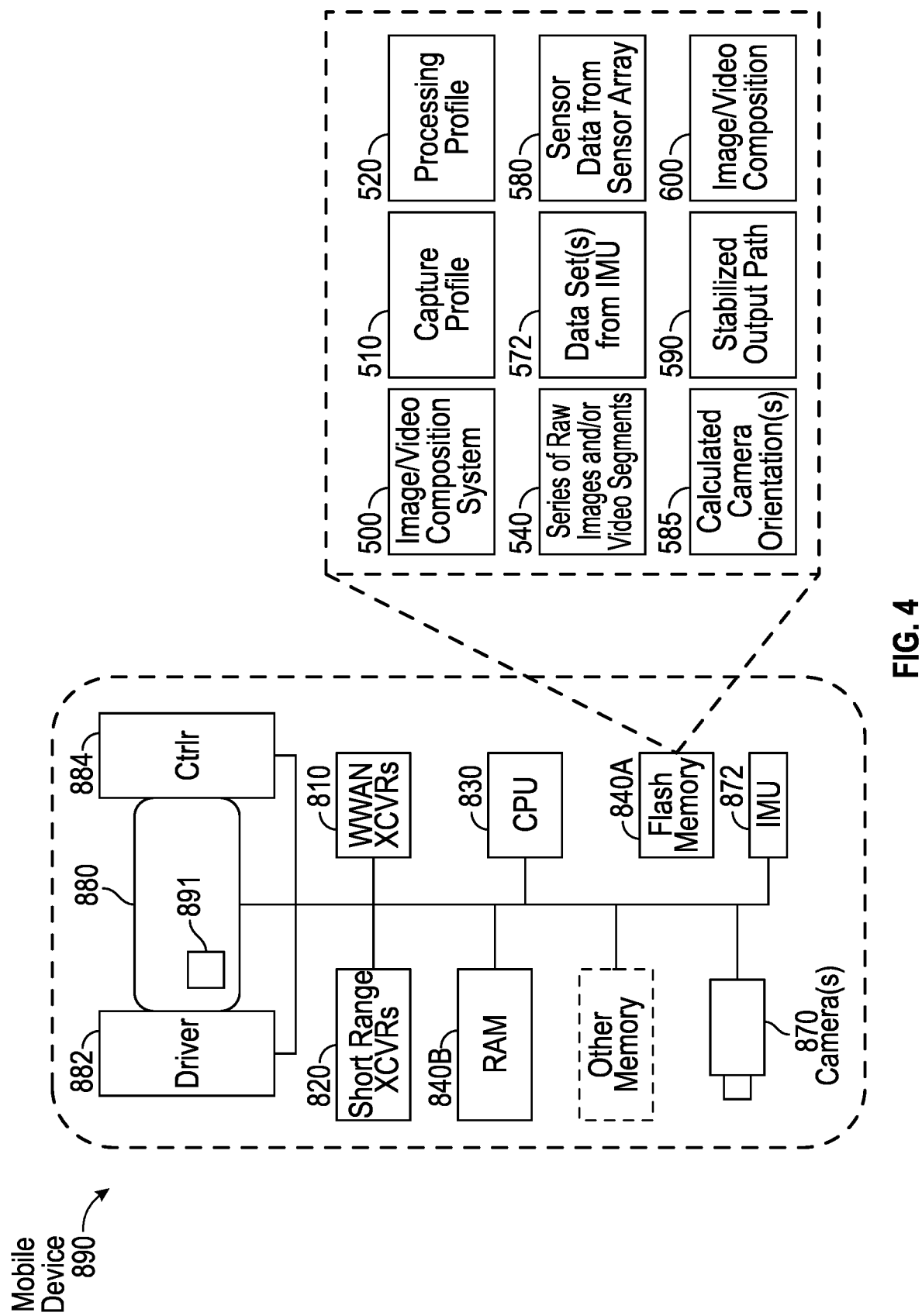
FIG. 4 is a diagrammatic representation of an example hardware configuration for a mobile device of the image capture, composition and sharing system of FIG. 3.

As shown in the example of FIG. 3, the high-speed processor 932 of the eyewear device 200 can be coupled to the camera system (visible-light cameras 218), the image display driver 942, the user input device 222, and the memory 934. As shown in FIG. 4, the CPU 830 of the mobile device 890 may be coupled to a camera system 870, a mobile display driver 882, a user input layer 891, and a memory 840A. The eyewear device 200 can perform all or a subset of any of the functions described herein which result from the execution of the image composition system 500 in the memory 934 by the processor 932 of the eyewear device 200. The mobile device 890 can perform all or a subset of any of the functions described herein which result from the execution of the image composition system 500 in the flash memory 840A by the CPU 830 of the mobile device 890. Functions can be divided in the image composition system 500 such that the eyewear device 200 captures the images, collects IMU data, and gathers sensor data, and the mobile device 890 performs the calculating, computing, and combining functions.

The server system 998 may be one or more computing devices as part of a service or network computing system, for example, that include a processor, a memory, and network communication interface to communicate over the network 995 with an eyewear device 200 and a mobile device 890.

The output components of the eyewear device 200 may include visual elements, such as the left and right image displays associated with each lens or optical assembly 180A, 180B as described above (e.g., a display such as a liquid crystal display (LCD), a plasma display panel (PDP), a light emitting diode (LED) display, a projector, or a waveguide). The eyewear device 200 may include a user-facing indicator (e.g., an LED, a loudspeaker, or a vibrating actuator), and/or an outward-facing signal (e.g., an LED, a loudspeaker). The image displays of each optical assembly 180A, 180B are driven by the image display driver 942. In some example configurations, the output components of the eyewear device 200 further include additional indicators such as audible elements (e.g., loudspeakers), tactile components (e.g., an actuator such as a vibratory motor to generate haptic feedback), and other signal generators. For example, the device 200 may include a user-facing set of indicators, and an outward-facing set of signals. The user-facing set of indicators are configured to be seen or otherwise sensed by the user of the device 200. For example, the device 200 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 200. Similarly, the device 200 may include an LED, a loudspeaker, or an actuator that is configured and positioned to be sensed by an observer.

Although shown as buttons 222 in FIG. 2B, the input components of the eyewear device 200 may be or include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location and/or force of touches or touch gestures, or other tactile-configured elements), and audio input components (e.g., a microphone), and the like. The mobile device 890 and the server system 998 may include alphanumeric, pointer-based, tactile, audio, and other input components.

In some examples, the eyewear device 200 includes a sensor array 980, as shown in FIG. 3. Elements of the sensor array 980 include the visible-light camera(s) 218, a user input device 222 (e.g., a button, touch screen or touchpad, a button switch), a microphone 993 (e.g., an array of two or more microphones), a depth sensor 213, and a collection of motion-sensing components referred to as an inertial measurement unit 972. The motion-sensing components may be micro-electro-mechanical systems (MEMS) with microscopic moving parts, often small enough to be part of a microchip.

The inertial measurement unit (IMU) 972 in some example configurations includes an accelerometer 974, a gyroscope 976, and a magnetometer 978. The accelerometer 974 senses the linear acceleration of the device 200 (including the acceleration due to gravity) relative to three orthogonal axes (x, y, z). The gyroscope 976 senses the angular velocity of the device 200 about three axes of rotation (pitch, roll, yaw). Together, the accelerometer 974 and gyroscope 976 can provide position, orientation, and motion data about the device relative to six axes (x, y, z, pitch, roll, yaw). The magnetometer 978 senses the heading of the device 200 relative to magnetic north. The position of the device 200 may be determined by location sensors, such as a GPS receiver, one or more transceivers to generate relative position coordinates, altitude sensors or barometers, and other orientation sensors. Such positioning system coordinates can also be received over the wireless connections 925, 937 from the mobile device 890 via the low-power wireless circuitry 924 or the high-speed wireless circuitry 936.

The IMU 972 may include or cooperate with a digital motion processor or programming that gathers the raw data from the components and compute a number of useful values about the position, orientation, and motion of the device 200. For example, the acceleration data gathered from the accelerometer 974 can be integrated to obtain the velocity relative to each axis (x, y, z); and integrated again to obtain the position of the device 200 (in linear coordinates, x, y, and z). The angular velocity data from the gyroscope 976 can be integrated to obtain the position of the device 200 (in spherical coordinates). The programming for computing these useful values may be stored in memory 934 and executed by the high-speed processor 932 of the eyewear device 200.

The eyewear device 200 may optionally include additional peripheral sensors, such as biometric sensors, specialty sensors, or display elements integrated with eyewear device 200. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The image capture, composition and sharing system 1000, as shown in FIG. 3, includes a computing device, such as mobile device 890, coupled to an eyewear device 200 over a network. The sensor array 980 of the eyewear device 200, as described herein, includes one or more visible-light cameras 218 for capturing a series of raw images segments, an inertial measurement unit 972 for collecting data about the position, orientation, and motion of the eyewear device 200.

The image capture, composition and sharing system 1000 further includes a memory for storing instructions, including potentially those in an image composition system 500, and a processor for executing the instructions. The system 1000 may utilize the memory 934 of the eyewear device 200 (FIG. 3) and/or the memory elements 840A, 840B of the mobile device 890 (FIG. 4). Also, the system 1000 may utilize the processor elements 932, 922 of the eyewear device 200 (FIG. 3) and/or the central processing unit (CPU) 830 of the mobile device 890 (FIG. 4). Furthermore, the system 1000 may further utilize the memory and processor elements of the server system 998 (FIG. 3). In this aspect, the memory and processing functions of the image capture, composition and sharing system 1000 can be shared or distributed across the eyewear device 200 and the mobile device 890 and/or the server system 998.

The mobile device 890 may be a smartphone, tablet, laptop computer, access point, or any other such device capable of connecting with eyewear device 200 using both a low-power wireless connection 925 and a high-speed wireless connection 937. Mobile device 890 is connected to server system 998 and network 995. The network 995 may include any combination of wired and wireless connections.

FIG. 4 is a high-level functional block diagram of an example mobile device 890. Mobile device 890 includes a flash memory 840A which includes programming to perform all or a subset of the functions described herein. Mobile device 890 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 890 includes an image display 880, a mobile display driver 882 to control the image display 880, and a controller 884. In the example of FIG. 4, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 890 with a user interface that includes a touchscreen input layer 891 for receiving input (by touch, multi-touch, or gesture, and the like, by hand, stylus or other tool) and an image display 880 for displaying content.

In the example shown in FIG. 4, the mobile device 890 includes at least one digital transceiver (XCVR) 810, shown as WWAN XCVRs, for digital wireless communications via a wide-area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor that functions as a central processing unit (CPU); shown as CPU 830 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 890 by configuring the mobile device 890 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage system, for storing programming and data. In the example, the memory system may include a flash memory 840A, a random-access memory (RAM) 840B, and other memory components, as needed. The RAM 840B serves as short-term storage for instructions and data being handled by the CPU 830, e.g., as a working data processing memory. The flash memory 840A typically provides longer-term storage.

Hence, in the example of mobile device 890, the flash memory 840A is used to store programming or instructions for execution by the CPU 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Referring again to FIG. 3, the example image composition and sharing system 1000 includes an eyewear device 200 coupled to a mobile device 890 over a network 995. The memory 934 includes an image composition system 500 and one or more profiles for capture and processing. In one example, there is a capture profile 510 and a processing profile 520. In one example, a user is able to set various parameters for the capture and/or processing profiles on a client device such as mobile device 890 prior to capture of images by a companion device such as eyewear device 200, as depicted by step 710 in FIG. 5.

Figure 5:
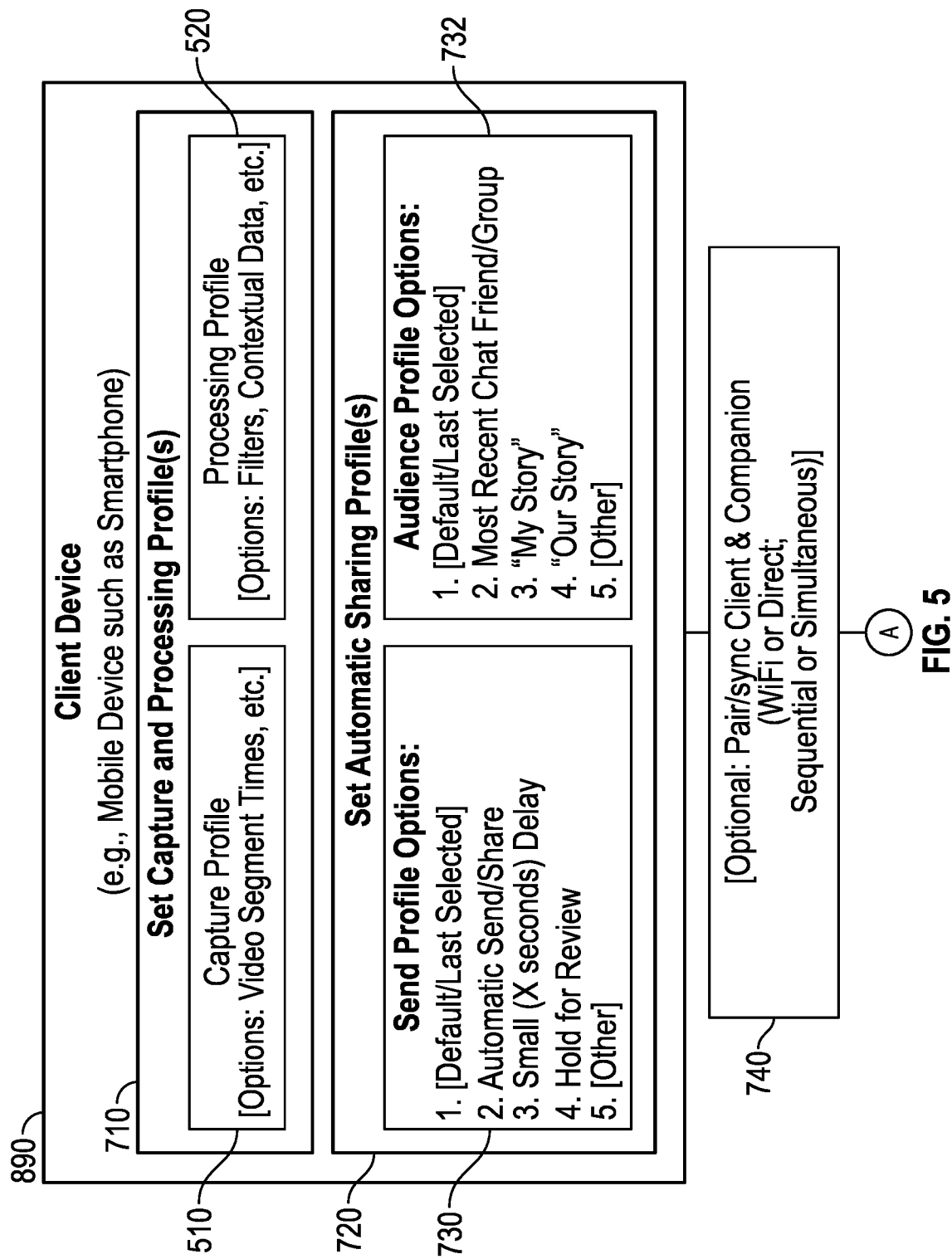
FIG. 5 is a flow chart of example steps for capturing and automatically sharing images.
Figure 5:
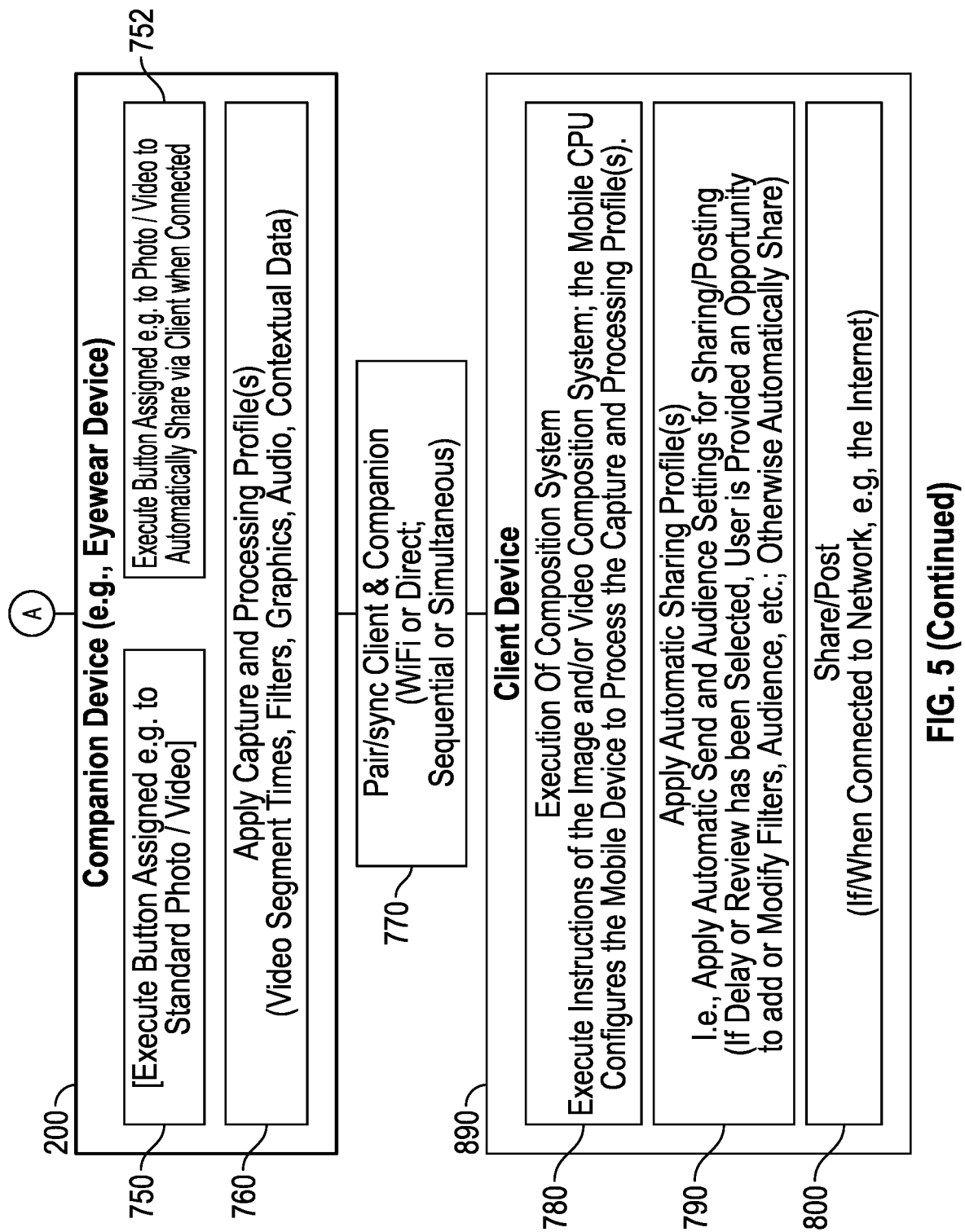

In one example, a user is also able to select options for one or more automatic sharing profiles as depicted by step 720 in FIG. 5. The one or more automatic sharing profiles may comprise separate profiles or a consolidated profile for send and audience options, which is the intent of the depiction of two joined blocks 730 and 732 in FIG. 5. It is therefore understood that the terms "send profile" and "audience profile" as used in FIG. 5 and generally herein, may include two separate profiles but, unless otherwise indicated, does not require two separate profiles but may be part of a single automatic sharing profile.

The automatic sharing profile may include options for assigning one or more input structures buttons 222 of eyewear 200 (depicted in FIG. 2B) to execute manual and/or automatic sharing functions. For example, for an eyewear device 200 that has two input structures—represented in that example as two buttons 222—a profile may assign one button 222 to standard photo/video handling without automatic sending functionality, and another button 222 to automatically share captured images via the client (mobile device) when connected. Alternatively, another profile such as the capture profile may include options for assigning one or more input structures buttons 222 of eyewear 200 to execute manual and/or automatic sharing functions. This latter arrangement further enables the example (discussed further as an example in the next paragraph below) where it is not necessary to set and/or upload the automatic sharing profile to mobile device 890 before capture 760 of the images by eyewear device 200, so long as the settings are established by the time any captured new images are synced 770 with the mobile device 890.

For example, a person of ordinary skill in the art will appreciate that although the automatic sharing profile(s) may be established on the mobile device 890 in a preferred example before an (optional) pairing/syncing 740 with eyewear device 200 in the example of FIG. 5, the automatic sharing profile(s) can be established on mobile device 890 virtually any time so long as it is before eyewear device 200 has captured 760 the images and syncs 770 with mobile device 890. In other words, the automatic sharing profile(s) should be established on mobile device 890 by the time syncing 770 with the new images occurs so that mobile device 890 can correctly and timely execute the profile parameters automatically at the time of syncing 770. The absence of a need to set the profile in advance in such an example is one reason why pairing/syncing 740 in FIG. 5 is indicated as optional.

In one example, send profile 730 includes options for the level of automation for the send feature. For example, a first option may be to simply apply a default or the last selected level of automation. A second option might be to specify that the client should automatically send and share the images upon connection. A third option might be to automatically send and share after a small (e.g., X seconds) delay, thereby providing the user with a limited time period to execute an option to review, modify and/or cancel the post. A fourth option might be to hold for review by the user, allowing the user an indefinite period to execute an option to review, modify and/or cancel the post. Of course, a person of ordinary skill in the art will appreciate that a variety of automatic send options could be envisioned and/or included, and other automatic send options are encompassed.

In one example, audience profile 732 includes options for establishing the audience for sharing so that once synced 770 with new images to be automatically shared, mobile device 890 can appropriately direct the post. For example, a first option may be to simply apply a default or the last selected audience. A second option might be to direct the post to the user's most recent chat. A third option might be to direct the post to a more general audience such as the user's "story." A person of ordinary skill in the art will appreciate that different programs and/or mobile apps may offer various permutations of a user's story, such as "My Story", or "Our Story," or even other non-"story" type audiences, all of which are within the scope of this example.

As noted above, in one example, execution of the instructions of the image composition system 500 by the processor 932 configures the eyewear device 200—in accordance with the capture profile 510—to capture a series 540 of raw image segments and to collect a data set 572 associated with each image segment in the series 540. In such an example, capture profile 510 may have the assignment data for input structure(s) 222. For example, the profile may assign, or direct eyewear 200 to assign, one button 222 to execute standard capture of photo/video 750 without automated sharing, while it assigns another button 222 to execute capture of photo/video with automated sharing 752. A person of ordinary skill in the art will appreciate, however, that it is not necessary to have two buttons, as there are for example a variety of ways to programmatically configure a single input structure (e.g., by long-press of a button, double press of a button, manipulation of a touch surface, audio instructions to a mic, etc.) to allow a user to select between standard capture 750 versus capture for automatic sharing 752. Accordingly, although FIG. 2 depicts an example wherein eyewear device 200 has two input structures 222, other numbers and types of input structures 222 may be incorporated.

In one example, the system includes a first processor in eyewear device 200 and a second processor in a client device such as mobile device 890, the second processor of mobile device 890 syncs with the first processor of eyewear device 200, and the second processor of mobile device 890 shares the at least one image over a network. In a further example of this configuration, the second processor of mobile device 890 applies the sharing profile to the image captured by eyewear device 200 and then shares the image in accordance with automatic share options and automatic audience options of the sharing profile. In another example, the system is entirely embodied in a single portable electronic device such as an eyewear device 200, such that a single processor on eyewear device 200 may be configured to perform functions including setting a sharing profile with automatic share options and automatic audience options, capturing an image, applying the automatic share options and automatic audience options of the sharing profile of the sharing profile, and sharing the image over a network.

In one example that includes a client device such as a mobile device 890, eyewear device 200 is agnostic as to the ultimate disposition of the image upon capture. Such a configuration may apply because, as noted above, the automatic sharing profile(s) can be established on mobile device 890 virtually any time so long as it is before eyewear device 200 has captured the images and syncs 770 with mobile device 890. In such a situation, the eyewear device 200 may be agnostic as to the assignment of input structures 222 at the time the image is captured, so long as the mobile device 890 is armed with the automatic sharing profile(s) and any data from eyewear device 200 relating to the capture (such as which input device 222 was used, or how it was used, in relation to automatic sharing) by the time of syncing 770, so that mobile device 890 is able to handle the new image according to the automatic sharing profile.

Each data set 572 includes information about the camera orientation collected by the IMU 972. In some implementations, each data set 572 includes information about the camera orientation associated with each and every image and/or frame in each video segment.

After the series 540 of images segments is captured, according to one implementation, the continued execution of the instructions of the image composition system 500 by the mobile CPU 830 configures the mobile device 890 to process the series 540 of images segments in accordance with the one or more profiles for capture and processing. The processing of images segments in accordance with the capture and/or processing profiles 710 is depicted as step 780 in FIG. 5.

In one example, the one or more profiles for capture and processing 710 comprise selected options for applying at least one "effect" prior to sharing. The effect(s) may be a visual effect such as filters, toning, border(s), caption(s), location tag(s), augmented reality features, and/or audio effects such as music, noises, or alteration of recorded audio (pitch, etc.).

The one or more profiles for capture and processing 710 may be separate from the automatic sharing profile(s) 720 or include parts that are components of the sharing profile(s) 720. According to the example, the options identified by one or more profiles for capture and processing 710 are automatically applied to the images after capture 752. In three examples, the effects may be applied 760 by the companion device 200 upon capture, the effects may be applied 780 by the client device 890 upon syncing and executing the composition system, or any combination of the two.

In one example, processing options and/or instructions are included in a separate processing profile 520. The processing profile 520 in some example configurations includes a stabilization setting. Example stabilization settings include No (do not perform stabilization during processing), Yes, and Custom (wherein the user selects a particular type of stabilization). The default stabilization setting may be set to Yes and may include instructions to (1) calculate a camera orientation 585 associated with each raw image segment, based on the data set 572 associated with each particular image segment, (2) compute a stabilized output path 590 based on the calculated camera orientation(s) 585, and (3) combine the series 540 of images segments in accordance with the stabilized output path 590 to produce an image composition 600.

The one or more profiles for capture and processing, e.g., the capture profile 510, includes a set of conditions or variables which determine how and when the camera(s) 218 on the eyewear device 200 will capture the series 540 of raw video segments. In one example, a capture profile 510 includes a start condition, a segment duration, a pause duration (between segments), and a quantity of segments. For example, a capture profile 510 may include a start condition equal to 9:18 p.m., a segment duration of six seconds, a pause duration of twenty seconds, and a quantity of ten segments. In accordance with this capture profile, the video cameras 218 on the eyewear device 200 would capture ten six-second video segments, with a twenty-second pause between each segment, starting at 9:18 p.m. This example capture profile 510 may be referred to as a fixed capture profile to the extent the conditions are set in advance of the image capturing and do not change.

The inertial measurement unit (IMU) 972 of the eyewear device 200 collects information about the position, orientation, and motion of the eyewear device 200 during capturing. The image composition system 500 configures the eyewear device 200 to collect data form the IMU 972 during the process of capturing each image segment. Each data set from the IMU 972 is associated with at least one image and/or frame of the raw video segment being captured. In some implementations, the eyewear device 200 will collect a first data set from the IMU 972 that is associated with each and every first frame of the first raw video segment. The data set(s) 572 collected from the IMU 972 may be stored in the memory 934, as shown in FIG. 3.

For each data set 572 stored in memory 934, the image composition system 500 configures the mobile device 890 to calculate a camera orientation 585. The camera orientation(s) 585 calculated by the mobile device 890 may be stored in the memory 840A, as shown in FIG. 4.

The composition system 500 configures the mobile device 890 to compute a stabilized output path 590 for video, which is among the various potential functions that are envisioned as coming within the scope of block 780 in FIG. 5, although other composition functions as described herein or known to a person of ordinary skill in the art may also be included.

In some example implementations, the execution of the instructions of the image composition system 500 configures the eyewear device 200—in accordance with the capture profile 510—to gather sensor data 580, which includes information collected by the sensor array 980. The sensor array 980 includes the camera(s) 218, a user input device 222 such as a button or touchpad, a microphone 993, a depth sensor 213, and the inertial measurement unit (IMU) 972. In this example, the capture profile 510 is a reactive capture profile; instead of a fixed set of conditions, the conditions are reactive to sensor data 580 gathered in real time from the sensor array 980. For example, the reactive capture profile may include a reactive start condition configured to start recording when the sensor data 580 includes a start input. The start input could be an audible start command received by the microphone 993 in the sensor array 980, a physical start command received by the input device 222 (such as tap or tap pattern on the button or touchpad), a start gesture made by the wearer and captured by the camera(s) 218, a select orientation of the eyewear device 100 (vertical, horizontal, still for a time) as indicated by the data set 572 collected by the IMU 972, or a select lighting condition as captured by the camera(s) 218. The select orientation of the eyewear device 200 may include a position component and a time component. For example, a select orientation may include a substantially horizontal position (on the face, for example) held for a minimum time period (e.g., for a number of seconds without moving in excess of a threshold value). Similarly, a select orientation may include a substantially vertical position (e.g., in a pocket, hanging on a shirt collar) held for a minimum time period.

A processing profile 520 in some examples includes a stabilization setting (e.g., no, yes, a custom selection of a particular stabilization algorithm), an interval effect (a visual effect to apply between segments, if any; e.g., cut, dissolve, fade, wipe), a visual layer (e.g., toning, color wash, border, frame, overlay elements), an audio layer (e.g., silence, the ambient sound, a musical soundtrack, a voice-over narration), and a playback speed (relative to the recording speed). Each setting may include a default setting, along with a user interface allowing the user to adjust each setting. For example, a processing profile 520 by default may include Yes for the stabilization setting, Cut for the interval effect (such that the video composition 600 is seamless between segments), None for the visual layer (no toning or added elements), Silence for the audio layer, and 2× for the playback speed.

In a related aspect the processing profile 520 may one or more reactive settings; that is, settings that change in accordance with the first or second data sets and/or the first or second camera orientations and/or the stabilized output path. For example, information within the first data set may suggest that a particular stabilization algorithm is well suited to the data. Information contained in the stabilized output path may suggest that a particular playback speed is well suited for the video composition during playback.

Upon syncing 770 the client device, e.g., mobile device 890, with the companion device, e.g., eyewear device 200, the automatic sharing profiles are applied by mobile device 890 to the newly captured 752 images. In this manner, the send profile options 730 and audience profile options 732 are applied to the captured images at 790 so that the mobile device 890 or other client device can share and/or post 800 according to the options defined by the profile(s).

Accordingly, a user is able to automate image capture, composition, and sharing using a companion device for capturing and a client device for sharing, with either or both devices taking part in the composition.

Any of the image capture, composition and sharing functionality described herein for the eyewear device 200, the mobile device 890, and the server system 998 can be embodied in one more computer software applications or sets of programming instructions, as described herein. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An image capture and sharing system, the system comprising:
   a camera configured to capture at least one image; a user input device configured to receive at least one share instruction;
   a memory and a processor coupled to the camera and the user input device; and
   programming in the memory, wherein execution of the programming by the processor configures the system to perform functions, including functions to:
   establish a sharing profile comprising automatic send options for sending a captured image and automatic audience options for establishing an audience for sharing of the captured image, the automatic send options including at least one of a last selected send option, automatically sending and sharing the at least one captured image upon connection, automatically sending and sharing the at least one captured image after a delay, or holding the at least one captured image for review, and the automatic audience options including at least one of a last selected audience, a most recent chat, or a story of a user;
   apply the sharing profile to at least one image automatically after capture; and
   share over a network the at least one image according to the automatic send options and automatic audience options.

2. The system according to claim 1, further comprising an eyewear device including a frame having a temple connected to a lateral side of the frame, the camera, and the user input device.

3. The system according to claim 1, wherein the user input device has at least two buttons for executing the capture of the at least one image by the camera.

4. The system according to claim 3, wherein the sharing profile comprises options for assigning the buttons of the user input device to execute at least one of manual or automatic sharing functions.

5. The system according to claim 4, further comprising a user device, wherein the sharing profile assigns a first button to a standard video/photo handling without automatic send functionality and a second button to automatically share captured images via the user device when connected to the user device.

6. The system according to claim 3, wherein execution of the programming by the processor configures the system to perform functions, including functions to:
   establish a capture profile including options for assigning one or more of the buttons of the user input device to execute at least one of manual or automatic sharing functions.

7. The system according to claim 6, wherein the capture profile includes options for assigning a button to enable the user to select between standard capture versus capture for automatic sharing based on at least one of a duration of pressing of the button, a number of times the button is pressed, manipulation of a touch surface by the user, or audio instructions from the user.

8. The system according to claim 6, further comprising a sensor array that senses a set of conditions or variables that determine how and when the camera will capture a series of raw image segments, wherein the capture profile includes the set of conditions or variables.

9. The system according to claim 8, wherein the capture profile includes at least one of a start condition, a segment duration, a pause duration between segments, or a quantity of segments.

10. The system according to claim 1, wherein execution of the programming by the processor configures the system to perform functions, including functions to:
  establish one or more profiles for capture and processing of the at least one image, the one or more profiles for capture and processing comprising options for applying at least one effect prior to sharing the at least one image, the effect comprising at least one of a visual effect or an audio effect.

11. The system according to claim 10, wherein the visual effect comprises at least one of a filter, toning, a border, a caption, a location tag, or an augmented reality feature and the audio effect comprises at least one of music, noises, or alteration of recorded audio.

12. The system according to claim 10, further comprising a user device, wherein the one or more profiles for capture and processing are automatically applied to the at least one image upon capture by the camera, by the user device upon syncing, or both.

13. The system according to claim 1, further comprising a sensor array that senses conditions, wherein execution of the programming by the processor configures the system to perform functions, including functions to:
  establish a processing profile including at least one of a stabilization setting, an interval effect, a visual layer, an audio layer, a playback speed, or one or more reactive settings that change in accordance with at least one of conditions sensed by the sensor array, orientation of the camera, or stabilization of the camera during image capture.

14. An image capture and sharing method, comprising:
  receiving options for a sharing profile comprising automatic send options for sending a captured image and automatic audience options for establishing an audience for sharing of the captured image, the automatic send options including at least one of a last selected send option, automatically sending and sharing the at least one captured image upon connection, automatically sending and sharing the at least one captured image after a delay, or holding the at least one captured image for review, and the automatic audience options including at least one of a last selected audience, a most recent chat, or a story of a user;
  applying the sharing profile to at least one image automatically after capture; and
  sharing over a network the at least one image according to the automatic send options and automatic audience options.

15. The method according to claim 14, further comprising capturing the at least one image using a camera of an eyewear device, the eyewear device including a frame having a temple connected to a lateral side of the frame, the camera, and a user input device.

16. The method according to claim 14, further comprising establishing a capture profile including a set of conditions or variables that determine how and when a camera will capture a series of raw image segments as the captured image, wherein the capture profile includes at least one of a start condition, a segment duration, a pause duration between segments, or a quantity of segments.

17. The method according to claim 14, further comprising establishing one or more profiles for capture and processing of the at least one image, the one or more profiles for capture and processing comprising options for applying at least one effect prior to sharing the at least one image, the effect comprising at least one of a visual effect or an audio effect, wherein the visual effect comprises at least one of a filter, toning, a border, a caption, a location tag, or an augmented reality feature and the audio effect comprises at least one of music, noises, or alteration of recorded audio.

18. The method according to claim 17, further comprising establishing a processing profile including at least one of a stabilization setting, an interval effect, a visual layer, an audio layer, a playback speed, or one or more reactive settings that change in accordance with at least one of conditions sensed by a sensor array, orientation of a camera that captures the at least one captured image, or stabilization of the camera during image capture.

19. A non-transitory computer readable medium comprising instructions which, when executed by a processor, cause an electronic system to:
  receive options for a sharing profile comprising automatic send options for sending a captured image and automatic audience options for establishing an audience for sharing of the captured image, the automatic send options including at least one of a last selected send option, automatically sending and sharing the at least one captured image upon connection, automatically sending and sharing the at least one captured image after a delay, or holding the at least one captured image for review, and the automatic audience options including at least one of a last selected audience, a most recent chat, or a story of a user;
  apply the sharing profile to at least one image automatically after capture; and
  share over a network the at least one image according to the automatic send options and automatic audience options.

20. The medium according to claim 19, further comprising instructions that, when executed by the processor, cause the electronic system to capture the at least one image using a camera of an eyewear device, the eyewear device including a frame having a temple connected to a lateral side of the frame, the camera, and a user input device.

* * * * *